UNITED STATES PATENT OFFICE.

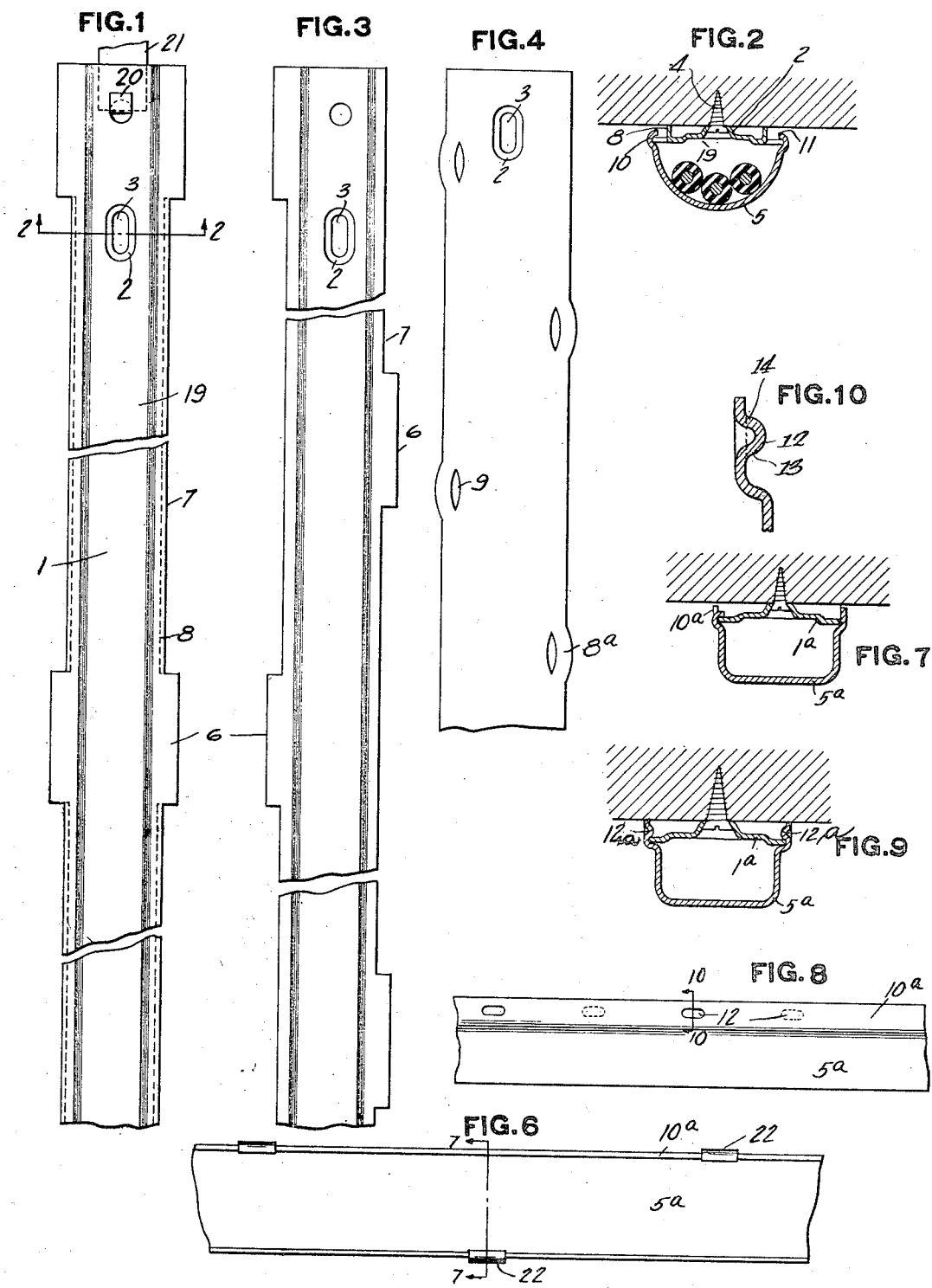

CHAUNCEY W. ABBOTT, OF PITTSBURGH, PENNSYLVANIA, ASSIGNOR TO THE AMERICAN CONDUIT MANUFACTURING COMPANY, OF PITTSBURGH, PENNSYLVANIA, A CORPORATION OF PENNSYLVANIA.

ELECTRICAL CONDUIT.

1,299,280. Specification of Letters Patent. Patented Apr. 1, 1919.

Application filed April 17, 1915. Serial No. 22,175.

*To all whom it may concern:*

Be it known that I, CHAUNCEY W. ABBOTT, a resident of Pittsburgh, in the county of Allegheny and State of Pennsylvania, have invented a new and useful Improvement in Electrical Conduits, of which the following is a specification.

This invention relates to that class of electrical conduits known as metal moldings. Said moldings are usually made from a base section adapted to be secured to a supporting surface, such as a wall or ceiling, and a removable cover section.

In conduits of this kind, where the edges of the cap member are sprung over the edges of the base member it is difficult to form the resilient cap of material thick enough to satisfy the requirements of fire underwriters and yet have sufficient elasticity so that the edges of the cap can be readily sprung over the edges of the base member. If the metal is thick enough for fire purposes it is too rigid for easy assembling. Also, conduits of this kind are frequently used for wiring old buildings in which the walls and ceilings are more or less wavy, and although the flat face member can be bent to follow the waves in the supporting surface, the U or channel shaped cap member is not so readily bent, and its grooved edges must engage over the edges of the flat base member for the full length thereof or not at all.

The object of the present invention is to provide a conduit of the character described of very simple construction, one easy to manufacture and easy to apply, even to a more or less wavy supporting surface; and which can be made of heavier stock than prior conduits of the same general construction.

The invention comprises a conduit constructed and arranged as hereinafter described and claimed.

In the accompanying drawings, Figure 1 is a plan view of one form of base member; Fig. 2 is a transverse section on the line 2—2, Fig. 1, and showing the base and cap members assembled; Fig. 3 is a plan view of another form of base member; Fig. 4 is a plan view of still another form of base member; Fig. 5 is a side elevation of another form of cap member; Fig. 6 is a bottom plan view thereof; Fig. 7 is a cross section on the line 7—7, Fig. 6, and illustrating the cap member and base assembled; Fig. 8 is a side elevation of another form of cap member; Fig. 9 is a transverse section of the cap member shown in Fig. 8, and illustrating the base and cap member assembled; and Fig. 10 is a detail sectional view, on the line 10—10, Fig. 8, and on a larger scale.

To overcome the objections to prior conduits of this class my improved conduit is so arranged that the cap and base member are engaged or interlocked with each other at intervals only, which requires less force in assembling the base and cap members and enables heavier stock to be used, and also enables the base and cap member to be assembled without bending the cap member longitudinally, even though the base member is bent in securing it to a wavy wall or other supporting surface. Several forms of the invention are shown in the drawing.

In Fig. 1 the base member 1 is a substantially flat strip provided at intervals on its rear face with protuberances or bosses 2 for spacing the edges thereof from the supporting surface. Preferably, these bosses are countersinks around openings 3 for the securing nails or screws 4, so that in addition to serving as spacing members said bosses form countersinks for the edges of the fastening means and leave the interior of the conduit smooth and unobstructed. The countersinks and holes 3 may be elongated to allow for adjustment and give greater latitude in placing the fastening screw or nail. The base may also be channeled between its edges, as at 19, in order to decrease the depth of the countersinks and provide a recess for receiving a tongue 20 of a member 21 for connecting the ends of adjacent conduits.

The base member 1 is formed from a strip of suitable metal and has its edges spaced from the supporting surface and projecting laterally in opposite directions and having fairly well defined corners. The cover member 5 is made from a strip of thin resilient material, such as sheet metal, and in cross section is of general U, channel or bow shape, its edges being arranged to engage or interlock with the edges of the base member.

The engagement or interlocking between the edges of the base and cap members occurs only at intervals and this effect can be secured in various ways. In Figs. 1 and 3 the edges of the base member are interrupted, consisting of a series of laterally projecting straight edge portions 6 separated by gaps 7, so that there is a series of projections at intervals along each edge of the base member. These projections may be formed by cutting away the projecting edge portions of the base member to form the gaps 7, as shown in Fig. 3, or by merely slitting the edges of the base member inwardly for short distances and bending down the edges between said slits to form flanges 8, as shown in Fig. 1, which flanges may be of such width as to contact with the supporting surface and assist in spacing the projecting edge portions of the base member from said surface, as shown in Fig. 2. The projecting edge portions of the base member may be directly opposite each other, as shown in Fig. 1, or may be alternately disposed or in staggered relation with each other, as shown in Fig. 3.

The same effect may be secured by expanding the edges of the base member at intervals without removing metal therefrom, such as by passing a suitable slitting and expanding tool through the strip for forming the base member to produce openings 9 near its edges, the material between said openings and the edges of the strip being forced outwardly in the plane of the strip to form projecting edge portions 8ª. These may be directly opposite each other, but preferably are in staggered relation, as shown in Fig. 4, in order not to unduly weaken the stock.

The edges of the cover member are provided on its inner face with grooves 10, which grooves are of material depth and formed with fairly steep sides, or on a short radius, so that when engaged with the edges of the base a firm grip is secured. The contour of this section is such that its body forms practically a bow spring, and as the material is resilient the deep grooves 10 securely engage the square edges of the base and hold the cover from accidentally pulling from the base. The extreme edges 11 of the cover strip are curved inwardly, so that the cover can be put in place by hooking one edge along the projections of one edge of the base strip, bringing the other edge down against the base strip and then pressing on the body of the cover. This tends to flatten it and causes the free edge to snap over the projections at the opposite edge of the base strip, where it will be firmly held, as described. However, the projections along the edges of the base strip will be fairly short, say an inch or so in length, and the intervals between said projections will be fairly long, say 12 inches apart, so that it is unnecessary to spring the edges of the cap member apart for the full length thereof, but only at intervals wherever one of the projections occurs on the base member. Consequently, very little force is needed to spring the edges of the cap member over the edges of the base member, and the two parts can be readily interlocked even though the cap member is formed of fairly thick material.

Furthermore, the base and cap member can be readily secured together, even though the supporting surface is somewhat wavy, as the edges of the cap member will spring over and interlock with the projections on the edges of the base member which are located at the high points of the waves in the supporting surface, and it is not essential that the edges of the cap member engage and interlock with every one of the projections on the edges of the base member.

The same effect may also be secured by interrupting the edges of the cap member instead of the edges of the base member, as in the forms just described. Such an arrangement is shown in Figs. 5 to 10, where the base member 1ª is a flat or channeled strip of uniform width from end to end and having continuous uninterrupted edges. The cap member 5ª is of general U or channel shape, with its edges continuous from end to end and having flat portions 10ª lying in planes substantially normal to the plane of the base member. The flat edge portions of the cap member are provided at intervals on their inner surfaces with projections arranged to engage and interlock with the edges of the base member. In Figs. 5 to 7 these projections are formed by slitting the stock at intervals inwardly from its edges to form narrow tongues 22 which are bent into hook form and are sprung over the edges of the base member, as in Fig. 7. The same effect may also be secured as shown in Figs. 8 to 10, by punching portions of the material along the edges of the cap member inwardly to form rounded knobs or bosses 12, which are left integral with the cap member and which, if desired, may also be so formed that their outer surfaces have a fairly gradual slope, as shown at 13, while their rear surfaces are more abrupt, as at 14, although this is not essential. These knobs or bosses are spaced at suitable intervals along the edges of the cap member and may lie directly opposite each other, but preferably are in staggered relation with each other, as shown in Fig. 8, so that a smooth, uninterrupted edge portion of the cap member lies opposite each knob or boss. This enables the cap member to be more readily interlocked with the base member. This conduit is assembled in the same manner as that before described, by first interlocking one edge of the cap member with the base member and then pressing down upon the cap member. The inclined surfaces of the knobs or bosses 12 act as wedges and enable the edges of the cap member to be sprung apart by the pressure so that the knobs or bosses pass behind the edge of the base member, and when fully interlocked the abrupt shoulders 14 on the knobs or bosses prevent the cap member from accidentally pulling from the base. If the knobs are rounded, at as 12ª in Fig. 9, the cap may be more readily removed from the base.

What I claim is:—

1. An electrical conduit comprising a base member in the form of a substantially flat plate having laterally projecting edges and provided with countersunk perforated bosses for securing the same to a supporting surface and spacing the edges of the base from such surface, and a cover formed of resilient metal of general bow-shape in cross section and having portions adapted to resiliently interlock with the projecting edges of the base member, such interlocking of the base member and cover being at intervals only.

2. An electrical conduit comprising a base member in the form of a substantially flat plate having laterally projecting edges and provided intermediate its edges with means for spacing the edges from the supporting surface, and a cover formed of resilient metal of general bow-shape in cross section, and having portions adapted to resiliently interlock with the laterally projecting edges of the base member, such interlocking of the base member and cover being at intervals only.

3. An electrical conduit comprising a base member in the form of a substantially flat plate provided with countersunk perforated bosses for securing the same to a supporting surface and spacing the same therefrom and having its edges flanged toward the supporting surface and with laterally projecting portions at intervals therealong, and a cover of general bow-shape in cross section and formed of resilient metal and provided with means to resiliently interlock with the laterally projecting portions on the edges of the base member.

In testimony whereof, I have hereunto set my hand.

CHAUNCEY W. ABBOTT.

Witnesses:
 ELBERT L. HYDE,
 GLENN H. LERESCHE.